July 9, 1968

J. T. CARTER ETAL

3,391,950

VEHICLE COUPLING SYSTEMS

Filed Feb. 24, 1966

INVENTORS
JOHN TALMAN CARTER, Deceased
BY MARY FAY CARTER, Administratrix
WALLACE R. NAVARRE BY Burns, Doane, Benedict, Swecker & Mathis

ATTORNEYS

United States Patent Office

3,391,950
Patented July 9, 1968

3,391,950
VEHICLE COUPLING SYSTEMS
John Talman Carter, deceased, late of Gulfport, Miss., by Mary Fay Carter, administratrix, 254 Oakwood Drive, Gulfport, Miss. 39501, and Wallace R. Navarre, Gulfport, Miss. (Box 116, West Beach, Biloxi, Miss. 39533)
Filed Feb. 24, 1966, Ser. No. 530,258
9 Claims. (Cl. 280—421)

ABSTRACT OF THE DISCLOSURE

A service line disconnection apparatus for an articulated tractor trailer vehicle which enables the driver to couple the service line connections on the tractor and trailer during coupling of the vehicle without leaving his cab and also to permit disconnection during uncoupling of the vehicles. Automatic aligning means cause the service line connections to be linearly aligned automatically by motion of the vehicles during coupling movement toward each other. The sequence in which service line connections are made is related to the sequence in which the vehicles are coupled so that dangerous sequences of operation, such as for example raising of the usual trailer landing gear due to service line connection occurring before vehicle connection are automatically prevented.

---

This invention relates to articulated vehicles of the tractor-trailer type and in particular to a coupling system for coupling a tractor to a trailer.

Articulated tractor-trailer vehicles sometimes include a coupling system of the so-called "fifth wheel" type. Such assemblies generally include a horizontally disposed, plate-like member, known as the fifth wheel, mounted on the tractor for connection to and supporting the forward under surface of the trailer when the vehicles are coupled. The fifth wheel is usually provided with a rearwardly open, longitudinal slot for receiving coupling pin on the forward under surface of the trailer. A locking arm on the fifth wheel may be provided, the locking arm being movable into a locked position in the slot rearwardly of the coupling pin to maintain the vehicles in coupled relation. Service lines connected to sources of fluid and electric power on the tractor may be releasably connected to corresponding service lines on the trailer through a service connection assembly provided with separable mating connector elements. The trailer may be provided with a landing gear movable to and from a ground engaging, operative position in which it supports the front end of the trailer when the vehicle is uncoupled, by a landing motor connected to at least one of the service lines on the trailer.

In uncoupling the tractor from the trailer, it is generally necessary that separate operations of disconnecting the service lines, moving the landing gear to its operative position, and moving the locking arm out of the slot be performed before the vehicles may be separated. These operations must be reversed when the vehicles are coupled. For many years, one or more of such operations has generally been performed manually by the driver who must leave the tractor cab, and, in many instances, is required to crawl about beneath the fifth wheel assembly in performance of these operations. Various arrangements heretofore proposed to reduce the inconvenience and the possible hazards to the driver, have included remotely operated coupling systems operable from the driver's cab so that the driver may be enabled to couple and uncouple the vehicles conveniently and safely without leaving his driving position.

However, such remotely operated coupling systems as have been previously devised have proven generally unsatisfactory for a number of reasons. For example, such prior systems have sometimes relied on movement of the tractor relative to the trailer during coupling and uncoupling to connect or pull apart, respectively, the mating service connector elements on the vehicles. Such a system may fail to provide sufficiently positive disconnection of the service lines on uncoupling, thereby permitting damage to the service lines, leakage of fluid from the service lines, and electrical arcing during separation. Additionally, such an arrangement may permit prior mechanical separation of the vehicles while the service lines are still connected, thereby leading to a potentially hazardous situation, if the brakes on the trailer are of a common pneumatic type, wherein the brakes may be released as long as fluid pressure is applied thereto. Furthermore, during coupling, such an arrangement may permit the service lines to connect before the coupling pin has been secured. In this event, power may be delivered prematurely to the landing motor and/or brakes of the trailer with the possiblity that landing gear may be raised and/or the trailer brakes released while the vehicle is still mechanically uncoupled.

Another disadvantage of the prior systems is that they have generally failed to include any effective sequencing system to prevent potentially dangerous out-of-sequence performance of the separate operations performed during uncoupling, such as, for example, separation of the tractor from the trailer without previous movement of the landing gear to its operative position.

In recognition of the difficulties associated with prior coupling systems of the type described above, it is therefore a general object of the present invention to provide a coupling system for coupling a tractor vehicle to a trailer vehicle which substantially obviates or minimizes the problems previously noted.

It is a particular object of the present invention to provide a coupling system for a tractor-trailer vehicle wherein the service lines on the vehicle may be positively disconnected from each other without separation of the vehicles.

It is another object to provide a coupling system for a tractor-trailer vehicle wherein the tractor may not be uncoupled from the trailer until the service lines on the vehicles have been positively disconnected from each other.

It is still a further object to provide a coupling system for a tractor-trailer vehicle so constructed that the service lines on the vehicles may not be disconnected from each other until the landing gear has been moved to its operative position to support the trailer vehicle.

It is a further object to provide a coupling system for a tractor-trailer vehicle wherein connection of the service lines on the tractor-trailer may not be effected until the vehicles have been positively, mechanically coupled.

It is yet another object to provide a coupling system for a tractor-trailer vehicle wherein the operations of moving the landing gear on the trailer to an operative position supporting the trailer, of disconnecting the service lines on the vehicles from each other, and of uncoupling the vehicles, may be entirely controlled from within the driver's cab and in only that sequence.

It is another object of the invention to provide a coupling system for a tractor-trailer vehicle wherein power is prevented from being applied to the landing gear and/or brakes of the trailer during coupling until the vehicles have been positively mechanically coupled.

It is yet a further object of the invention to provide a coupling system having service lines provided with separable mating service connections wherein the service connections are automatically aligned for connection during coupling desipte considerable misalignment in the longitudinal axes of the tractor and trailer vehicles.

These objects are accomplished in the environment of an articulated vehicle, including a tractor vehicle and a trailer vehicle adapted to be coupled to the tractor vehicle. The tractor vehicle includes service power means and service lines connected thereto. The trailer vehicle includes service lines adapted for the distribution of power.

A coupling assembly according to one form of the present invention includes a first connector means adapted to be connected to the service lines on the trailer vehicle. Second connector means adapted to be connected to the service lines on the tractor vehicle for mating connection with the first connector means are provided. First and second support means adapted to be mounted on the tractor and trailer vehicles respectively support the first and second connector means in mating connection when the vehicles are in coupled relation. One of the support means includes selectively actuatable moving means for relatively moving the first and second connector means away from each other independent of any relative movement between the remainder of the one support means and the other support means. In this manner, the service lines on the tractor and trailer vehicles may be positively disconnected while the vehicles are in coupled relation.

In describing the invention, reference is made to one preferred embodiment illustrated by way of example in the accompanying drawings, in which.

Figure 1:
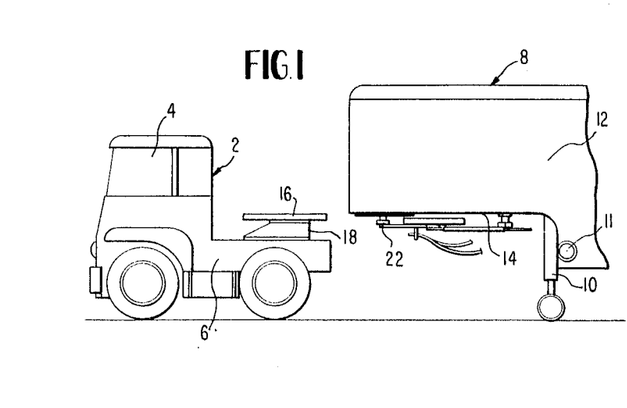
FIGURE 1 is a side view of a portion of an articulated tractor-trailer vehicle provided with a coupling system constructed in accordance to the present invention.

Referring to FIGURE 1 of the drawings, a tractor 2 including a driver's cab 4 and a horizontal rear bed 6 is shown in uncoupled relation with a trailer 8. The trailer 8 includes a landing gear 10 and associated landing motor 11, the landing gear being movable to an operative position engaging the ground, in which it supports the front end 12 of the trailer when the vehicles are uncoupled. The under surface 14 of the trailer adjacent the forward end 12 thereof may be supported upon a fifth wheel 16 mounted on the bed 6 of the tractor by a suitable mounting 18.

Figure 2:
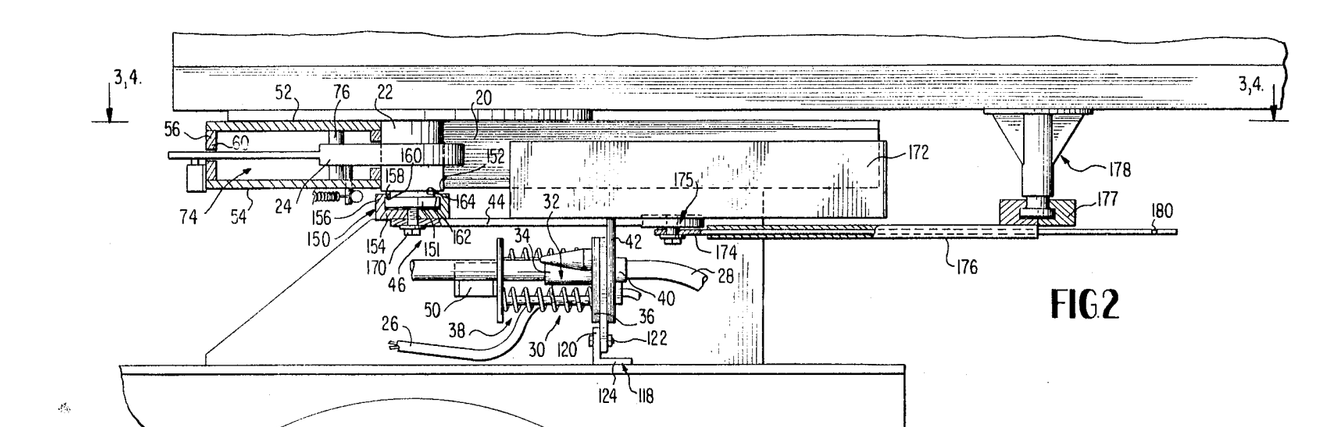
FIGURE 2 is a part sectional side view of a portion of a coupling system constructed in accordance to the present invention.

A slot 20 in the fifth wheel 16, as shown in FIGURE 2, receives a depending coupling pin or king pin 22, secured to the under surface 14 of the trailer on the longitudinal axis thereof. The coupling pin 22 is retained within the slot 20 in coupled relation by a movable locking arm 24. Pneumatic and electric service lines 26 connected to sources of fluid and electric power (not shown) on the tractor 2 are releasably connected to corresponding service lines 28 on the trailer by a separable service connection assembly 30. The service connection assembly 30 includes separable service connectors 32 of the pull-apart type comprising female service connector elements 34 mounted on a movable support plate 36 movably supported within a frame 38 on the tractor 2, and male connector elements 40 mounted on a locating support plate 42 secured to an aligning rod 44 forming part of an aligning assembly 46 on the trailer. The locating plate 42 contacts the frame 38 when the vehicles are coupled and aligns and positions the male connector elements 40 in adjacent aligned relation to the female connector elements 34 on the movable support 36. Springs 48 within the frame urge the connector elements 34 and 40 into connection. A service disconnect, electrical solenoid 50, controlled from within the driver's cab 4, may be actuated to move the movable plate 36 away from the locating plate 42 to positively disconnect the service lines 26 and 28 on the vehicles while the vehicles are still in coupled relation.

Referring in more detail to FIGURE 2, the fifth wheel 16 may be seen to comprise a horizontally disposed, generally rectangular, rigid plate defined by opposed parallel flat upper and lower outer surfaces 52 and 54, respectively, and by a peripheral edge surface 56 at right angles to the outer surfaces. The fifth wheel is rigidly mounted above the bed 6 of the tractor vehicle 2 by the mounting 18 with its longitudinal axis in alignment with the longitudinal axis of the tractor 2.

Figure 3:
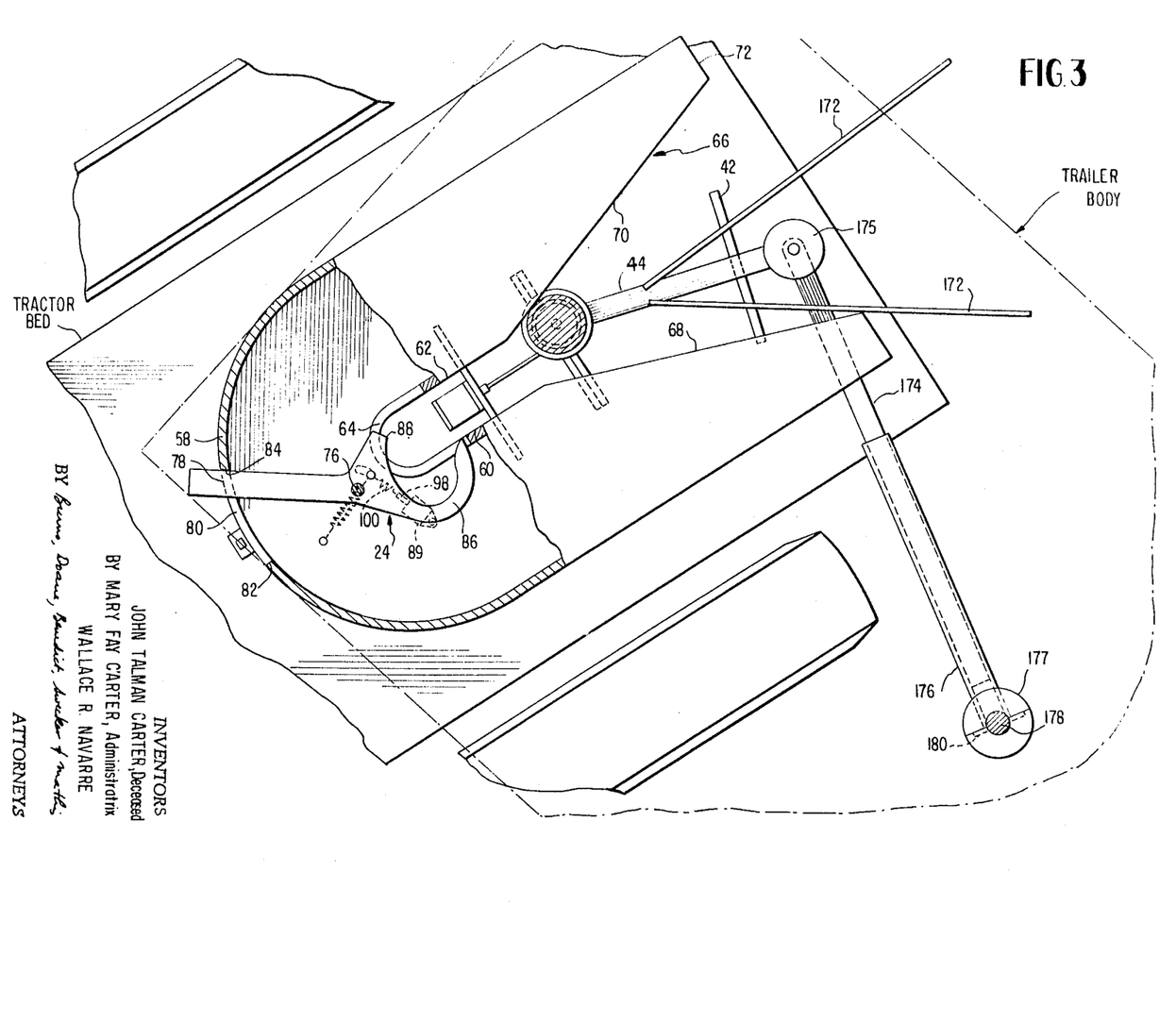
FIGURE 3 is a horizontal view partially in cross section of a portion of the coupling system as shown in FIGURE 2 taken along the lines 3—3 therein, showing the coupling pin about to enter into engagement with the fifth wheel.

The forward extremity of the fifth wheel 16, as shown in FIGURE 3, is provided with a semi-circular edge 58. The fifth wheel 16 includes the longitudinal slot 20 which is defined by two parallel, longitudinally extending side walls 60 and 62 spaced symmetrically laterally of the longitudinal axis of the tractor, and by a semi-circular forward extremity 64 concentric with the semi-circular forward edge 58 of the fifth wheel 16. The fifth wheel also includes a rearward, V-shaped slot 66 defined by two spaced opposed, converging shoulders 68 and 70 spaced symmetrically laterally of the longitudinal axis of the tractor and extending forwardly from the rear extremity 72 of the fifth wheel 16 to intersect the longitudinal slot 20. The coupling pin 22 of the trailer 8 in its coupled position is received within the longitudinal slot 20 in abutting contact with the forward extremity 64 thereof.

Although the fifth wheel of the preferred embodiment has been described as having flat outer surfaces, it will be appreciated that a fifth wheel having downwardly and rearwardly sloped outer surfaces adjacent the V-slot so as to cause the front end of the trailer vehicle to be elevated during coupling to clear the landing gear from the ground, may be provided, as is generally known.

In order to retain the coupling pin 22 in coupled relation with the fifth wheel 16 within the longitudinal slot 20, the previously described locking arm 24 is provided. The locking arm 24 transmits the towing forces exerted by the tractor 2 in motion through the coupling pin 22 to the trailer 8.

Figures 4, 5, 6, 7:
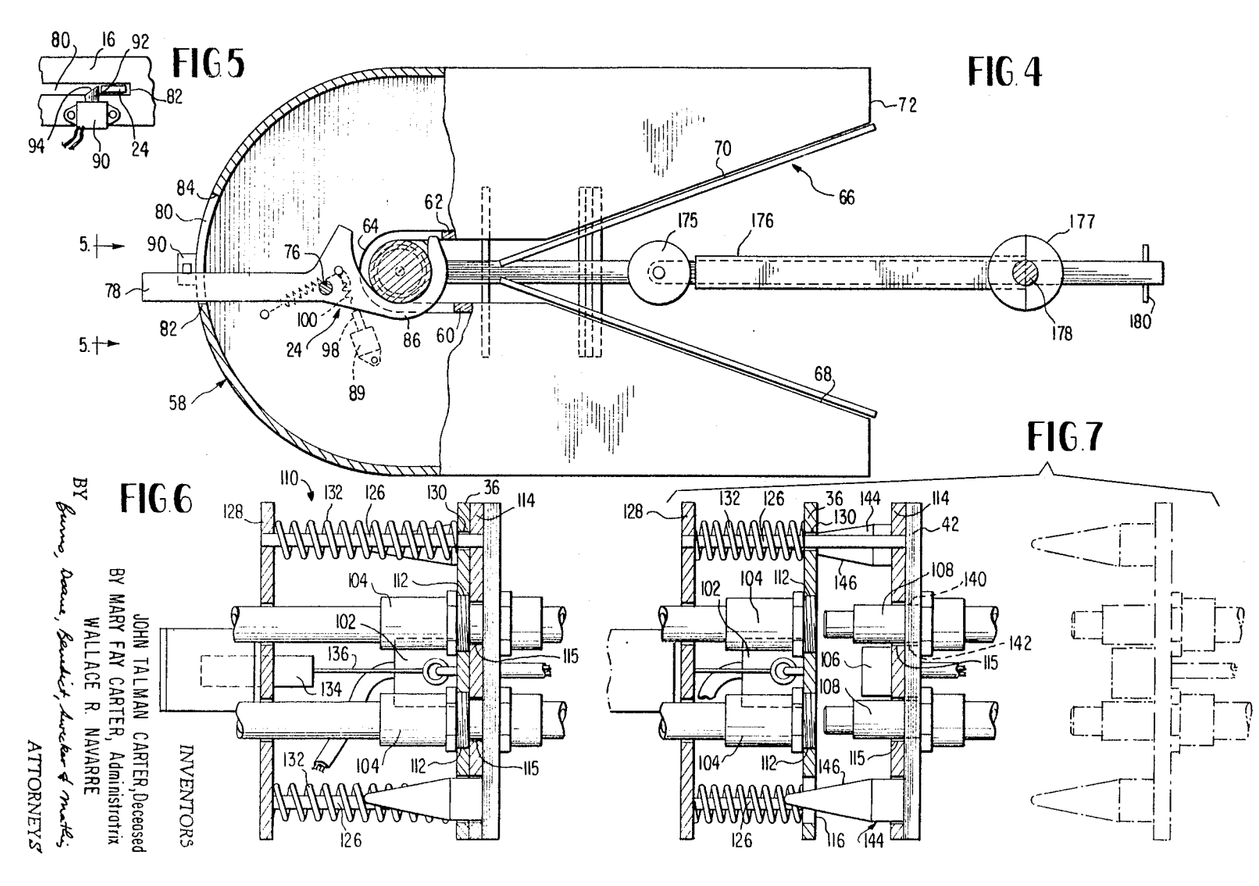
FIGURE 4 is a side view partially in cross section of a portion of the coupling system as shown in FIGURE 2 taken along the lines 4—4 therein, showing the coupling pin in engagement with the fifth wheel.
FIGURE 5 is a side view of a portion of the fifth wheel of the coupling assembly shown in FIGURE 1 showing the safety lock solenoid of the system.
FIGURE 6 is a top view partially in cross section of the service connection assembly forming a part of the present invention, the service connection assembly being shown in the connected position.
FIGURE 7 is a sectional top view of the service connection assembly shown in FIGURE 6 in the unconnected position.

The locking arm 24, as shown in FIGURES 3 and 4, includes a horizontally disposed lever positioned within a horizontally disposed, parallel sided aperture 74 provided in the fifth wheel intermediate the outer surfaces 52 and 54 thereof. The locking arm 24 is mounted for rotation in the horizontal plane about a pivot point 76 positioned on the fifth wheel 16 forwardly of the longitudinal slot 20 adajcent the longitudinal axis thereof. An outer end portion 78 of the locking arm extends outwardly of the forward edge 58 of the fifth wheel 16 through a horizontally disposed, radial transverse port 80 in the forward edge 58 having forward and rear radial extremities 82 and 84, respectively. The other extremity of the locking arm 24 is provided with a locking hook 86 which extends transversely of the longitudinal slot 20 and rearwardly of the coupling pin 22 in abutting contact with a portion of the periphery thereof, to prevent separation of the coupling pin 22 from the fifth wheel 16 in the coupled position. When the locking hook 86 is in its coupled position, the end portion 78 is in abutting contact with the forward extremity 82 of the radial slot 86.

The locking arm 24 may be rotated about the pivot point 76 to a release position (FIGURE 3) in which the locking hook 86 is pivoted laterally outwardly of the longitudinal slot 20 to permit the coupling pin 22 to be released from the fifth wheel 16 so that the vehicles may be separated. In the released position of the locking arm, the outer end portion 78 abuts the rearward extremity 84 of the radial slot 80 in the fifth wheel 16.

So that the locking arm 24 may be moved mechanically from its unlocked to its locked position as the coupling pin 22 enters the longitudinal slot 20, a locking projection 88 is provided on the locking arm 24 adjacent the forward extremity of the locking hook 86, projecting inwardly of the longitudinal slot 20 in the fifth wheel 16 when the locking hook 86 is positioned laterally outwardly of the slot in the released position. As the coupling pin 22 enters the longitudinal slot 20 and comes into contact with the locking projection 88, it will rotate the locking projection 88 and the locking arm 24 about the pivot point 76 so that the locking hook 86 moves transversely into the slot rearwardly of the coupling pin 22.

The geometry of the locking arm and the locking projection are such that the draft coupling may be released and the tractor uncoupled from the trailer by merely actuating an unlock solenoid 89, described hereinafter, and moving the tractor away from the trailer.

In order to retain the locking arm 24 positively in the locked position, a safety lock solenoid 90 is provided. The safety lock solenoid, as shown in FIGURE 5, is positioned on the fifth wheel 16 adjacent the radial slot 80 therein and includes a spring-loaded plunger 92 which extends vertically and transversely of the slot 80 in the normal, unactuated state of the solenoid 90. The plunger 92 is in abutting contact with the rearward edge of the locking arm 24 when the locking arm is in its locked position so as to prevent any pivotal movement of the locking arm 24 about the pivot point 76. Application of electric current to the solenoid 90 to actuate the plunger 92 withdraws the plunger into the solenoid relative to the radial slot 80, so as to permit the outer end 78 of the locking arm to be moved rearwardly within the radial slot 80.

The safety lock solenoid plunger 92 includes a rearwardly and downwardly sloping face 94 on its rearward surface to permit the locking arm 24 to depress the plunger 92 downwardly into the solenoid 90 as the locking arm moves forwardly from the unlocked to the locked position, if this should be required.

So that the locking arm 24 may be released in order to free the coupling pin 22 for movement within the slot 20 in the fifth wheel 16 so that the vehicles may be separated, the previously described unlock solenoid 89 connected with the locking arm 24 is provided. The unlock solenoid 89 includes a spring-loaded, normally outwardly projecting plunger 98 connected by a link 100 at its free extremity to the locking arm 24 at a point rearward of the pivot point 76. Actuation of the unlock solenoid 89 withdraws the plunger 98 into the solenoid so as to rotate the locking arm 24 about the pivot point 76 to move the locking hook 86 laterally and outwardly from the slot 20 to free the coupling pin 22.

The link 100 is capable of tensile elongation for a purpose to be described hereinafter and in the preferred embodiment comprises a tension spring.

As previously described, the tractor includes sources of electric power and air pressure such as, for example, a generator and an air compressor, respectively. The previously described pneumatic and electric service lines 26 on the tractor 2 connected to the sources of pneumatic and electric power, respectively, are releasably connected through the previously described service connection assembly 30 to the corresponding air and service lines 28 on the trailer vehicle 8 which distribute service power about the trailer vehicle. For example, the trailer vehicle 8 may include air brakes connected to the air service lines. Additionally, trailer lighting services and the landing motor 11 for operting the landing gear 10 are connected to the electrical service line. It will be appreciated by those skilled in the art that service connection lines for fluid other than air, such as, for example, hydraulic fluid connections, might be provided.

Referring in more detail to FIGURES 6 and 7, the previously described female service connector elements 34 may be seen to include one electrical female connector and two female pneumatic connectors 104. The previously described male service connector elements 40 include corresponding male connector electric and pneumatic elements 106 and 108, respectively.

The separable connectors for the air service lines may be of any known type, comprising separable, pull-apart, mating male and female elements, which provide fluid communication between the air lines when the connectors are in connected relation and which seal the lines when the connectors are disconnected. Similarly, the electrical connector may be of any known type, comprising separable, pull-apart male and female elements, so as to provide electrical connection between the electrical servic lines of the trailer and tractor when the connector elements are connected.

In the preferred embodiment, the female elements 102 and 104 of the electrical and air connectors, respectively, are connected to the electrical and air service lines, respectively, of the tractor and the corresponding male connectors are connected to the service lines of the trailer vehicle. However, it will be appreciated that a reverse arrangement of the male and female elements of the connectors may be provided.

The female connector elements 102 and 104 of the electric and air connectors are supported by a tractor connector assembly 110 comprising the frame 38 and movable support plate 36 for the connector elements 102 and 104, mounted for motion along the longitudinal axis of the tractor 2.

The movable support plate 36 comprises a vertically extending, rectanguular plate positioned symmetrically about the longitudinal axis of the draft vehicle and having a horizontally disposed, longitudinal axis extending transversely of the longitudinal axis of the tractor 2. The movable support plate 36 is provided with two upper holes 112 transversely spaced symmetrically of the longitudinal axis of the tractor 2 receiving the female air connectors 104 in secured relation with the plate 36 and a central hole beneath and between the upper holes 112 receiving the electrical female connector element 102 in secured relation with the plate 36. The female connector elements 102 and 104 of the service connectors extend rearwardly and outwardly of the movable plate 36.

The frame 30 includes a rectangular rear plate 114 coextensive with the movable plate and parallel thereto, positioned symmetrically and transversely of the longitudinal axis of the tractor 2. The rear plate 114 includes three holes 115 aligned with the female connector elements 102 and 104 on the movable plate, of sufficient diameter to permit the male connector elements 106 and 108 to pass through the rear plate as described hereinafter. Two aligning holes 116, for a purpose to be described, are additionally provided in the rear plate 114 adjacent two diagonally opposed corners thereof.

A supporting bracket 118 as shown in FIGURE 2 is provided and includes an upright web 120 connected to the lower extremity of the rear plate 114 of the frame 38 by any suitable connectors 122, such as for example, bolts, and a lower flange 124 at right angles to the web 120 fixedly connected to the bed 6 of the tractor 2. The supporting bracket 118 supports the rear plate 114 of the frame 38 between and beneath the shoulders 68 and 70 of the fifth wheel 16 defining the V-slot 66 therein.

Two guiding rods 126 positioned adjacent the other diagonally opposed corners of the rectanguular rear plate 114 extend forwardly at right angles therefrom. A forward plate 128 coextensive with the movable plate 36 and parallel thereto is secured to the forward extremities of the guiding rods 126 in spaced-opposed, parallel relation to the rear plate 114.

The movable support plate 36 previously described is provided with a pair of diagonally opposed holes 130 adjacent two of its corners for receiving the guiding rods 126 so as to permit the support plate 36 to be movably mounted on the guiding rods 126 between the forward and rear plates of the frame 128 and 114, respectively, in spaced parallel relation therewith.

Springs 132 positioned about the guiding rods 126 between the forward plate 128 and the movable support plate 36 urge the movable support plate 36 toward the rear plate 114.

The previously described service disconnect solenoid 50 is positioned on the forward plate 128 and is provided with a movable plunger 134 connected by a link 136 at its free extremity to the movable support plate 36. In the normal inactive state of the solenoid 50, the plunger 134 does not restrict the movement of the support plate 36 toward the rear plate 114 under the action of the springs 132. However, electrical current applied to the service disconnect solenoid 50 withdraws the plunger 134 into the solenoid 50 to move the support plate 36 against the springs 132 away from the rear plate 114 for a purpose to be described hereinafter.

The male connector elements 106 and 108 of the electrical and pneumatic service connectors connected to the service lines 28 on the trailer are secured to the previously described locating support plate 42. The locating support plate 42 is secured to the aligning rod 44 forming part of the aligning assembly 46 to be discussed hereinafter. The locating support plate 42 is of rectangular shape similar to that of the rear plate 36 of the frame 38. The locating support plate 42 includes two laterally spaced upper holes 140 receiving the male elements 108 of the air service connectors in secured relation with the plate 42 and a central hole 142 beneath and between the upper holes 14 for receiving the male element 106 of the electrical service connector in secured relation with the plate 42. The male coupling elements 106 and 108 of the electrical and air service connectors, respectively, project forwardly of the locating support plate 42.

Two cylindrical, forwardly directed aligning pins 144, each having a conical forward portion 146, are secured to the locating support plate 42 adjacent two opposed diagonal corners thereof. During coupling of the vehicles, the aligning assembly 46 (as described hereinafter) aligns the locating plate 42 and the rear plate of the frame 114 in parallel relation so that they enter into abutting contact as the vehicles are coupled. The aligning pins 144 are so positioned as to enter the previously described aligning holes 116 in the rear plate to align the male and female service connector elements supported on the locating plate 42 and movable support plates 36, respectively. In the aligned position, the male elements 106 and 108 on the locating support plate 42 project through the holes 112 in the rear plate of the frame in alignment with the corresponding female elements of the service connectors. In addition, the aligning pins 144 help maintain the rigidity of service connection between the vehicles during travel.

In operation, the springs 132 urge the female coupling elements 102 and 104 on the movable support plate 36 rearwardly into mating contact with the male elements 106 and 108 on the locating support plate 42 so as to effect positive connection between the electrical and air service lines, respectively, on the trailer and draft vehicles.

Actuation of the service disconnect solenoid moves the support plate 36 away from the rear plate 114 and locating plate 42 so as to positively disconnect the service connectors before the second support plate and the rear plate of the frame independently of any separation of the vehicles. In this manner, positive disconnection of the service lines of the tractor and trailer vehicles may be effected prior to any physical separation of the vehicles, thereby permitting significant safety advantages to be provided.

It will be observed that such a service connection system, wherein the service lines are only disconnected when power is applied from one of the sources on the tractor to a normally inactivated service connection system motor, offers considerable "fail safe" advantages as compared to a system utilizing a normally activated motor to maintain the service lines in connection in that accidental failure of one source of power during travel does not cause the service lines to become immediately disconnected with consequent loss to the trailer of the other unfailed source of power.

In order to enable the service connectors to be aligned during coupling of the vehicles even though the longitudinal axes of the tractor and trailer vehicles are relatively inclined, the aligning assembly 46 is provided.

The aligning assembly 46 includes, as best seen in FIGURES 2 and 3, a bearing cage 150 rotatably mounted at the free extremity of the coupling pin 22 below the fifth wheel plate 16. The free extremity 151 of the coupling pin 22 is provided with a peripheral groove 152 of rectangular cross section adjacent its free extremity. The bearing cage 150 comprises a horizontally extending, circular base 154 abutting the free extremity 151 of the coupling pin, a vertically extending, peripheral rim 156 abutting the periphery of the coupling pin 22 adjacent the free extremity 151 thereof, and a horizontally directed, circular flange 158 at the free extremity of the vertical rim 156 positioned within the groove 152 in the coupling pin 22. The horizontal flange 158 includes a lower surface 160 abutting the lower surface 162 of the groove in the coupling pin 22, which supports the bearing cage, and a vertical inner edge 164 which abuts the inner vertical surface of the groove 152 in coupling pin 22 so as to locate the bearing cage 150 accurately with respect to the coupling pin 22. In the preferred embodiment, the bearing cage 150 is divided about a vertical plane passing through a diameter of the base of the bearing cage so as to separate the cage into two half cylinders which may be connected together about the coupling pin 22 by any suitable connectors, such as, for example, threaded connectors.

The horizontally disposed aligning rod 44 connected to the base of the bearing cage by a suitable connector 170, such as a threaded connector, extends rearwardly therefrom. As previously described, the locating support plate 42 is secured to the aligning rod 44. The locating support plate 42 depends from the aligning rod 44 and is disposed transversely and symmetrically of the longitudinal axis thereof.

A pair of guiding wings 172 are secured to the aligning rod intermediate the bearing cage 150 and the locating support plate 42. The guiding wings 172 extend symmetrically rearwardly and outwardly from the aligning rod 44 and are shaped to conform to the inclination of the shoulders 68 and 70 defining the V-slot 66 of the fifth wheel 16.

During a coupling operation in which the longitudinal axes of the tractor and trailer are not aligned, as the fifth wheel 16 approaches the coupling pin 22, one or other of the shoulders 68 and 70 on the fifth wheel, defining the V-slot 66, will contact an adjacent wing 172 on the aligning rod 44, thereby rotating the aligning rod 44 on the bearing cage 150 about the coupling pin 22. As motion of the draft vehicle toward the trailer vehicle continues, the aligning rod 44 will be progressively rotated until its longitudinal axis is aligned with the longitudinal axis of the draft vehicle. In this position, the locating support plate 42 which extends transversely of the longitudinal axis of the aligning rod 44 will be parallel to the rear plate 114 of the frame 38 which extends transversely of the longitudinal axis of the draft vehicle so that it may enter into abutting contact with the rear plate 114.

In order to restrict the range of rotational movement of the aligning rod 44 about the coupling pin 22 so as to protect the service lines 28 on the trailer and additionally so as to support the free extremity of the aligning rod 44, a horizontally disposed guiding rod 174 is provided. The guiding rod 174 is connected to the free rearward extremity of the aligning rod 44 by a pivotal connection 175, and extends rearwardly therefrom. Any suitable form of pivotal connection between the aligning rod 44 and guiding rods 174 may be provided.

The guiding rod 174 adjacent the free extremity thereof is slidably received within a horizontally disposed guiding tube 176. The guiding tube 176 is pivotally connected to the under surface 14 of the trailer by a bearing 177 supported on a depending pivot point 178 on the trailer 8 spaced rearwardly of the coupling pin 22 on the longitudinal axis of the trailer. Forward rotation of the aligning rod 44 about the coupling pin 22 causes the guiding rod 174 to move through the guiding tube 176. A stop 180 on the free extremity of the guiding rod 174 limits the range of sliding movement of the guiding rod 174 through the guide tube 176 so that the range of rotational movement of the aligning rod is restricted in order to prevent the aligning rod 44 turning too far about the coupling pin 22, which would damage the service lines 28 connected to the service connection on the locating support 42. In addition, the guiding rod also helps to support the aligning rod in the horizontal plane.

It will be seen that the aligning assembly 30 described permits the service connections to be automatically aligned during coupling of the vehicles despite considerable misalignment between the longitudinal axes thereof in an advantageous and novel manner.

Figure 8:
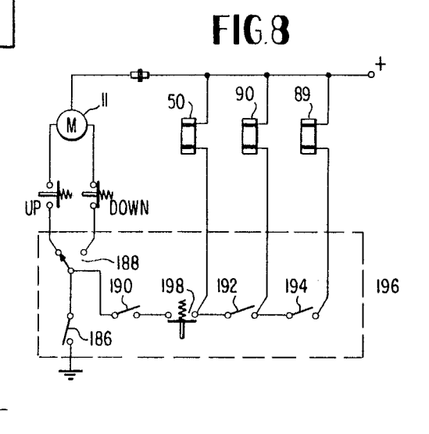
FIGURE 8 is a schematic diagram of one embodiment of an electrical control circuit which may be utilized with the present invention with the switches shown in the positions they occupy at the completion of coupling.

To enable the driver to couple and uncouple the trailer vehicle without leaving his driving position in the cab, a sequential electrical control circuit, represented schematically in FIGURE 8, is provided.

It will be appreciated that the electrical circuit shown in FIGURE 8, showing the preferred embodiment, may be varied by one skilled in the art and that the inclusion of such refinements, as for example, power relays to direct power to the landing motor, interlocking, and latched relays, etc., may be contemplated.

Referring to FIGURE 8, it may be seen that the previously described unlock 89, safety lock 90, and service disconnect solenoids 50, and the landing gear motor (when the electrical service lines on the vehicles are connected) are connected in parallel between the source of electric power on the draft vehicle and a base line. The base line is provided with a plurality of switches connected in series for controlling the sequential operation of the landing motor and solenoids.

The switches comprise a power switch 186, a landing motor switch 188, a service disconnection switch 190, a safety lock switch 192, and an unlock switch 194. The switches are mounted on a master console 196 in the driver's cab and in the preferred embodiment are mounted in sequence from left to right.

The power switch 186 is a single pole switch having one connection to ground and the other to the base line. The landing motor switch 188 is a double pole switch provided with alternative UP and DOWN connections which may be separately selected so as to direct electric current through the landing motor 11 in either direction to raise or lower the landing gear 10, respectively, as required.

The service disconnect switch 190 is a single pole switch connected in series in the base line intermediate the connections thereto of the landing motor switch 188 and the service disconnect solenoid 50. A normally open spring-loaded interlock switch 198 moved to its closed position by the landing gear 10 as it reaches the operative position, is included in the base line intermediate the connections thereto of the landing motor switch 188 and the service disconnect solenoid 50. The safety lock switch 192 is a single pole switch connected in series in the base line intermediate the connections thereto of the safety lock solenoid 90 and the service disconnect solenoid 50. The unlock switch 194 is a single pole switch connected in series in the base line intermediate the connections thereto of the safety lock solenoid 90 and the unlock solenoid 89.

During travel of the vehicles in their coupled relation, all the switches will be in their disengaged OFF positions. During the uncoupling operation, when the vehicles are stationary, the driver will operate the switches on the master console in sequence from left to right, commencing with the power switch 186.

Operation of the power switch 186 connects the landing motor switch 188 and the base line to ground so that the landing motor switch 188 may next be selectively operated to its DOWN position to complete a power circuit through the landing motor 11 to lower the landing gear. Suitable, normally closed DOWN and UP limit switches, opened physically by the landing gear at its operative and inoperative extremes of travel respectively disconnect power from the landing motor 11 whenever the landing gear 10 reaches its operative and inoperative extremes of travel respectively. As the landing gear 10 reaches the operative position engaging the ground, it closes the interlock switch 198, thereby connecting the service disconnect switch, through the base line, to ground, thereby placing the service disconnect switch 190 in condition to be operated.

Operation of the service disconnect switch 190 completes a power circuit through the service disconnect solenoid 50. Actuation of the service disconnect solenoid 50, as previously described, moves the movable support plate 36 forwardly within the frame 38 thereby disconnecting the male and female, air and electrical service connectors.

It will be noted that this arrangement provides for positive disconnection of the service lines on the tractor and trailer vehicles before any uncoupling or separation of the vehicles has occurred and only after the landing gear has been moved to its operative position.

This may be particularly advantageous where, as is now sometimes the case, the trailer vehicle is provided with air brakes which are automatically applied whenever the air connection to the brakes is disconnected. In such a case, if the driver has inadvertently failed to set the trailer brakes prior to uncoupling, the brakes will be automatically applied as the service lines are disconnected before any physical disconnection of the trailer and tractor has commenced. The considerable safety advantage provided thereby will be readily appreciated.

Operation of the service disconnect switch 190 additionally connects one connection of the safety lock switch 192 to ground, through the base line so that safety lock switch 192 may then be operated to complete a power circuit through the safety lock solenoid 90. Operation of the safety lock solenoid 90, as previously described, withdraws the safety lock plunger 92 relative to the radial slot 80 in the fifth wheel, thereby freeing the locking arm lever 24 for movement.

Actuation of the safety lock switch 192 also connects one connection of the unlock switch 194 to ground through the base line, so that the unlock switch 194 may then be operated to complete a power circuit through the unlock solenoid 89. Actuation of the unlock solenoid 89, as previously discussed, moves the locking hook 86 of the locking arm 24 out of the slot 20 thereby freeing the coupling pin 22 for movement out of the fifth wheel 16. The tractor 2 may now be driven off to separate the vehicles.

It will be appreciated that the series operation of the power switch 186, service disconnect switch 190, interlock switch 198, safety lock switch 192, and unlock switch 194 thus described prevents any of the various operations of lowering the landing gear, disconnecting the service lines, freeing the locking arm for movement, and moving the locking arm out of the slot to free the coupling pin 22 from being performed out of sequence, thereby offering considerable safety advantages.

As the driver commences the coupling operation, the switches on the master console will have been left in the positions they occupied at the close of the uncoupling operation. As the driver backs the tractor 2 toward the trailer vehicle 8, the coupling pin 22 of the trailer vehicle 2 will commence to enter the solt 20 on the fifth wheel 16. As the coupling pin 22 moves inwardly of the slot 20, it will contact the locking projection 88 on the locking arm 24 so that the locking hook 86 will be moved into the slot 20 behind the king pin 22 in the manner previously described. The link 100 connecting the still activated plunger 98 of the unload solenoid 89 to the locking arm 24 expands by virtue of its extensible properties previously described to prevent damage to the unlock solenoid as the locking arm 24 is mechanically set during coupling.

As the locking arm 24 moves to the locked position, the outer end portion 78 of the locking arm lever 24 wil move over the still depressed safety lock plunger 92 into abutting contact with the forward edge 82 of the radial slot 80.

During the coupling operation, the locating support plate 42 on the trailer vehicle 8 is automatically aligned and brought into abutting contact with the rear plate 114 on the draft vehicle by the aligning assembly 30, as previously described. However, throughout the backing operation, the male and female elements of the service connectors will be prevented from entering into connection by the still activated service disconnect solenoid 50.

It will be seen that the positive disconnection thus effected by the service disconnect solenoid 50 offers important advantages during coupling also in that the possibility of premature connection of the sources of electric and air power on the tractor to the landing motor 11, or to the brakes of the trailer through the service lines before the vehicles have been positively coupled, is positively prevented. Such hazards as premature raising of the landing gear or premature release of the brakes caused by the sudden application of power thereto are thereby prevented so as to provide substantial safety advantages.

When the coupling pin 22 has been moved to its fully engaged position during the backing of the tractor, the switches on the console 196 are operated by the driver in reverse sequence from right to left. Disconnection of the unlock switch 194 inactivates the unlock solenoid 89 so that it will not move the locking arm 24 from its locked position during travel. Disconnection of the safety lock switch 192 inactivates the safety lock solenoid 90 so that the plunger 92 moves transversely, adjacent the radial slot into abutting contact with the rear of the outer end portion 78 of the locking arm 24 to prevent movement of the locking arm 24 about the pivot point 76 from the locked position. Disconnection of the service disconnect switch 190 inactivates the service disconnect solenoid 50 so that the springs 132 urge the movable support plate 36 rearwardly so as to urge the female electrical and air service connector elements into connecting relation with the male elements of the service connectors to connect the service lines on the vehicles. Movement of the landing motor switch 188 to its UP position applies power to the landing motor 11 in the reverse sense to raise the landing gear 10 from its operative position. Movement of the landing gear 10 from its operative position permits the interlock switch 198 to revert to its normally open position. Finally, disconnection of the power switch 186 removes the groond connection from the base line to inactivate the other switches on the master console, so that inadvertent operation of any of the switches during travel thereafter will have no effect, thus increasing the safety of the coupling system.

In constructing a coupling system for coupling a tractor to a trailer, according to the present invention, it will be seen that a substantially safer and more convenient coupling is provided. In particular, the positive disconnection of the service lines on the tractor and trailer vehicles effected by the service disconnect solenoid presents substantial safety advantages during coupling and prevents possible damage to the service lines during separation of the vehicles, loss of fluid from the fluid connections and arcing during separation of the electrical connectors.

Additionally, where the pneumatic brakes on the trailer are of the type wherein disconnection of the service of air pressure automatically applies the brakes, such positive disconnection of the service lines as is provided by the present invention ensures that the trailer brakes will be applied before the vehicles can be separated.

Moreover, such positive disconnection of the service lines increases the safety with which the coupling operation may be performed as it ensures that power may not inadvertently be connected to the landing motor or brakes until the vehicles have been mechanically coupled.

Another significant advantage of the coupling system is provided by the unique aligning assembly which aligns the service connections on the vehicles in the correct alignment for connection despite considerable misalignment of the longitudinal axes of the tractor and trailer vehicles during coupling. The manner in which damage to the service lines caused by too great rotation of the aligning rod is prevented by the guiding rod, further increases safety of operation.

Partciular advantages of convenience and safety are provided by the electrical control circuit forming a part of the present coupling system whereby control of the separate operations of lowering the landing gear, disconnecting the service lines, freeing the locking arm for movement, and moving the locking arm out of restraining engagement with the coupling pin may all be controlled by the driver from his position within the cab without any requirement on his part for him to leave the cab or perform manual uncoupling operations.

Additionally, the arrangement of the control switches in such a manner that they may only be operated in sequence offers greater safety in that it prevents hazards arising from potentially dangerous out-of-sequence operations, such as for example, uncoupling and separating the vehicles before the landing gear has been lowered.

It will be appreciated that the terms "upper," "lower," "forward," and "rear," as used to describe coupling system components, are merely employed to indicate the relative placement of such components with respect to one another and are not intended as a limitation.

Although the invention is described with reference to a preferred embodiment, it will be apparent to those skilled in the art that additions, deletions, modifications, substitutions and other changes not specifically described and illustrated in the preferred embodiment may be made which will come within the purview of the appended claims.

We claim:
1. In combinatilon with an articulated vehicle including a tractor and a trailer vehicle, a coupling assembly coupling said tractor to said trailer, said tractor including service power means and service lines connected thereto, said tractor further including fifth wheel means provided with a longitudinally extending slot along the longitudinal axis of said tractor, said fifth wheel means further including converging internal shoulders extending forwardly from the rear extremity of said fifth wheel means defining a V-shaped slot therein intersecting the longitudinal slot, said trailer vehicle including service lines adapted for the distribution of power, said coupling assembly comprising; first connector means connected to the service lines on said tractor, second connector means connected to the service lines on said trailer in mating connection with said first connector means with the longitudinal axes of said first and second connector means in alignment when said vehicles are in coupled relation, a coupling pin secured to said trailer, said coupling pin being received within the longitudinal slot in said fifth wheel means when the vehicles are in coupled relation, an aligning assembly for aligning said second connector means with said first connector means during coupling of the vehicles, said aligning assembly including; elongated aligning means connected with said second connector means, said aligning means pivotally connected to said coupling pin extending rearwardly therefrom for supporting said second connector means, said elongated aligning means having a longitudinal axis parallel to the longitudinal axis of said second connector means, guiding means secured to said elongated aligning means for contacting the internal shoulders defining the V-shaped slot in said fifth wheel means during coupling of the said vehicles so as to rotate said aligning means about said coupling pin to align the longitudinal axis of said second connector means with the longitudinal axis of said first connector means, first support means mounted on said tractor for supporting said first connector means in mating connection with said second connector means when the vehicles are in coupled relation, said first support means including selectively actuatable, normally inactivated, service disconnection means for relatively moving said first and second connector means away from each other independent of any relative movement between the remainder of said first support means and said second connector means, releasable coupling means connected with said fifth wheel means for coupling said vehicles, said coupling means permitting said vehicles to be separated upon release of said coupling means, service disconnection control means operatively connected to said service disconnection means for actuating said service disconnection means, and coupling control means operatively connected to said coupling means for releasing said coupling means, said coupling control means being operatively connected with said service disconnection means for permitting release of said coupling means only after actuation of said service disconnection means.

2. A service line connection assembly for an articulated vehicle, the articulated vehicle including a tractor vehicle and a trailer vehicle adapted to be coupled to the tractor vehicle, the tractor vehicle including service power means and service lines connected thereto, the trailer vehicle including service lines adapted for the distribution of power, said service line connection assembly comprising:

first connector means adapted to be connected to the service lines on the tractor vehicle, second connector means adapted to be connected to the service lines on the trailer vehicle for releasable mating connection with said first connector means, first and second support means adapted to be mounted upon the tractor and trailer vehicles respectively for supporting said first and second connector means respectively, in generally horizontal disposition in alignment with the longitudinal axes of the vehicles when the vehicles are in coupled relation, spring means connected to at least one of said first and second connector means and the adjacent one of said support means for exerting a spring force on said one of said connector means in one direction to urge said one of said connector means into mating connection with the other of said connector means when the vehicles are in coupled relation, said one of said support means further including,
power actuated, normally inactivated service disconnection means for relatively moving said one of said first and second connector means away from said other of said connector means in a direction reversely of said one direction upon application of power to said service disconnection means; and means for selectively connecting said service disconnection means with the service power means through the service lines, whereby the service lines on the tractor and trailer vehicles may be positively disconnected while the vehicles are in coupled relation.

3. A service line connection assembly in accordance to claim 2 wherein said one of said support means comprises; movable support means connected to said first connector means for supporting said first connector means, frame means adapted to be secured to the tractor, said frame means connected with said movable support means for supporting said movable support means for movement, said frame means further including; positioning means contacting said second support means when the vehicles are in coupled relation for positioning said second connector means for mating connection with said first connector means when the vehicles are in coupled relation, said spring means operatively associated with said frame means contacting said movable support means for urging said movable support means toward said second support means so as to urge said first connector means into mating connection with said second connector means, said service disconnection means connected with said frame means and said movable support means for moving said movable support means away from said second support means upon selective connection of said disconnection means with the service power means so as to disconnect said first and second connector means.

4. A service line connection assembly in accordance to claim 2 wherein said second support means comprises; a vertically extending, rectangular, locating plate adapted to be connected with the trailer, said locating plate having a longitudinal axis disposed transversely of the longitudinal axis of the tractor when the vehicles are in coupled relation, said second connector means secured to and extending forwardly towards the tractor of said locating plate, two forwardly extending locating pins, each locating pin positioned adjacent one of two diagonally opposed corners of said locating plate extending forwardly therefrom, each said locating pin including a cylindrical base portion adjacent the locating plate and a conical forward portion extending forwardly from said base portion, said first support means including; a frame extending longitudinally of the tractor, said frame including; a vertically extending rear plate coextensive with and abutting said locating plate when the vehicles are in coupled relation, said rear plate including locating holes positioned adjacent two diagonally opposed corners of said rear plate receiving said locating pins so as to locate said locating plate in coextensive relation with said rear plate, said rear plate further including element holes extending about said second connector means on said locating plate to permit said second connector means to project through the element holes and forwardly of said rear plate when said vehicles are in coupled relation, a bracket including a vertical portion secured to said rear plate along the lower edge thereof and a horizontal portion adapted to be secured to the tractor, two guiding rods secured to said rear plate, each said guiding rod positioned adjacent one of the other two diagonally opposed corners of said rear plate extending forwardly therefrom, a vertically extending forward plate coextensive with said rear plate secured to the free extremities of said guiding rods in spaced opposed parallel relation to said rear plate, a vertically extending, rectangular movable plate coextensive with said forward and rear plates, said movable plate including supporting holes adjacent two diagonally opposed corners of said movable plate receiving said guiding rods, said movable plate being supported on said guiding rods in abutting contact with said rear plate in spaced opposed relation to said forward plate, said rear plate including mounting holes for securing said first connector means to said movable plate so positioned as to position said first connector means in mating connection with said second connector means when said movable plate is in abutting contact with said rear plate, two longitudinally extending compression springs, each spring positioned about one of said guiding rods between said forward plate and said movable plate urging said movable plate rearwardly, and a selectively actuatable, normally inactivated motor, said motor including a longitudinally reciprocable element connected at its free extremity to said movable plate, said element being moved forwardly upon actuation of said motor to move said movable plate forwardly from said rear plate to disconnect said first and second service connectors.

5. In combination with an articulated vehicle, including a tractor and a trailer vehicle adapted to be coupled to said tractor vehicle, said tractor including service power means and service lines connected thereto, said service lines on said tractor including first connector means, said tractor further including fifth wheel means provided with a longitudinal slot extending along the longitudinal axis of said tractor, said fifth wheel means further including converging internal shoulders extending forwardly from the rear extremity of said fifth wheel defining a V-shaped slot therein intersecting the longitudinal slot, said trailer vehicle including service lines adapted for the distribution of power, said service lines on said trailer including second connector means adapted to be connected to the service lines of the trailer for mating connection with said first connector means with the longitudinal axes of said first and second connector means in alignment when the vehicles are in coupled relation, a service line connection positioning assembly aligning said first and second service connections for connection during coupling of said vehicles said positioning assembly comprising; a coupling pin secured to the trailer, said coupling pin being received within the longitudinal slot in said fifth wheel means when said vehicles are in coupled relation, an aligning assembly for aligning said second connector means with said first connector means during coupling of said vehicles, said aligning assembly including; elongated aligning means connected with said second connector means, said aligning means pivotally connected to said coupling pin extending rearwardly therefrom for supporting said second connector means, said elongated aligning means having a longitudinal axis parallel to the longitudinal axis of said second connector means, guiding means secured to said elongated aligning means for contacting the internal shoulders defining the V-shaped slot in said fifth wheel means during coupling of said vehicles so as to rotate said aligning means about said coupling pin to align the longitudinal axis of said second connector means with the longitudinal axis of said first connector means, whereby said first and second connector means are aligned for connection during coupling of said vehicles.

6. A combination in accordance to claim 5 wherein said aligning assembly comprises; a horizontally disposed aligning rod pivotally connected to said coupling pin extending rearwardly therefrom, said aligning rod connected with said second connector means for supporting said second connector means, said aligning rod further including a longitudinal axis parallel to the longitudinal axis of said second connector means, a pair of rearwardly inclined guiding wings secured to said aligning rod extending symmetrically and laterally of the longitudinal axis thereof, said guide wings inclined to conform to the inclination of the shoulders defining the V slot in said fifth wheel means said guiding wings adapted to contact the internal shoulders of said fifth wheel means during coupling to rotate said aligning rod about said coupling pin so as to align the longitudinal axis of said second connector means with the longitudinal axis of said first connector means, a horizontally disposed guide rod pivotally connected to the rearward extremity of said aligning rod, a guide sleeve positioned about said guide rod adjacent the rearward extremity thereof slidably receiving said guide rod and a bearing cage secured to said guide sleeve, said bearing cage pivotally connected to said trailer vehicle at a point spaced rearwardly of said coupling pin on the longitudinal axis of said trailer.

7. In an articulated vehicle including a tractor vehicle and a trailer vehicle adapted to be coupled to the tractor vehicle, the tractor vehicle including service power means and service lines connected thereto, the trailer vehicle including service lines adapted for the distribution of power, the improvement comprising, a coupling system for coupling the vehicles including:
 separable service connection means adapted to be positioned on the tractor and trailer vehicles for connecting the service lines on the vehicles when the vehicles are in coupled relation, said service connection means including,
  service disconnecting means for disconnecting the service lines on the vehicles upon application of power to said service disconnecting means;
 releasable coupling means adapted to be mounted on the tractor and trailer vehicles for coupling the vehicles, said coupling means permitting the vehicles to be separated upon release of said coupling means,
 service disconnection control means operatively connected with said service disconnection means and with the service lines for selective application of power to said service disconnection means for actuating said service disconnection means to disconnect the service lines;
 coupling control means operatively connected to said coupling means for releasing said coupling means,
 means preventing operation of said coupling control means prior to operation of said service disconnection control means for permitting release of said coupling means only after actuation of said service disconnection means,
 whereby the vehicles may not be uncoupled until the service lines have been disconnected.

8. In an articulated vehicle of the type recited in claim 7, the trailer further including a movable landing gear having a ground engaging portion adapted to support the forward end of the trailer in an operative position and a landing motor connected to the landing gear for moving the landing gear to the operative position, the improvement recited in claim 7 further including; landing motor control means adapted to be connected with the landing motor when the service lines on the tractor and trailer vehicles are connected, said landing motor control means for selectively directing power to the landing motor to move the landing gear to the operative position, said landing motor control means operatively connected with said service disconnection control means for permitting actuation of said service disconnection means only after operation of the landing motor, whereby in uncoupling the vehicles, the service lines on the vehicles may not be disconnected until the landing gear has been moved to an operative position and whereby the vehicles may not be uncoupled until the service lines have been disconnected.

9. In combination with an articulated vehicle including a tractor vehicle and a trailer vehicle a coupling system for coupling said tractor to said trailer, said tractor vehicle including service power means and service lines connected thereto, said tractor vehicle further including fifth wheel means provided with a longitudinally extending slot along the longitudinal axis of said tractor vehicle, said fifth wheel means further including converging internal shoulders extending forwardly from the rear extremity of said fifth wheel means defining a V-shaped slot intersecting the longitudinal slot, said trailer vehicle including a coupling pin adapted to be received within the longitudinally extending slot in said fifth wheel means when said vehicles are in coupled relation, said trailer further including service lines adapted for the distribution of power, said trailer also including a movable landing gear having a ground engaging portion supporting the forward end of said trailer in an operative position and a landing motor connected to said landing gear for moving said landing gear between the operative position and an inoperative position for travel, said coupling system comprising; first connector means connected to said service lines on said tractor vehicle, second connector means connected to said service lines on said trailer vehicle in mating connection with said first connector means when said vehicles are coupled with the longitudinal axes of said service connector means in alignment, second support means connected to said second service connector means supporting said second connector means, a horizontally disposed aligning rod pivotally connected to said coupling pin extending rearwardly therefrom, said aligning rod connected with said second connector means supporting said second connector means, said aligning rod further including a longitudinal axis parallel to the longitudinal axis of said second connector means, a pair of rearwardly inclined guiding wings secured to said aligning rod extending symmetrically and laterally therefrom, the guiding wings inclined to conform to the inclination of the shoulders defining the V-slot in said fifth wheel, said guiding wings contacting the internal shoulders of said fifth wheel to prevent rotation of said aligning rod about said coupling pin when said vehicles are in coupled relation, a horizontally disposed guide rod pivotally connected to a rear extremity of said aligning rod supporting said rear extremity of said aligning rod, a guide sleeve positioned about said guide rod adjacent the rearward extremity thereof slidably receiving said guide rod for supporting said guide rod, a bearing cage secured to said guide sleeve for supporting said guide sleeve, said bearing cage pivotally connected to said trailer vehicle at a point spaced rearwardly of said coupling pin on the longitudinal axis of said trailer, a movable plate connected to said first connector means for supporting said first connector means, a longitudinal extending frame secured to said tractor vehicle supporting said movable plate for movement along the longitudinal axis of said frame, said frame further including a rear plate extending transversely of the longitudinal axis of said tractor, said rear plate abutting said second support means when the vehicles are in coupled relation, said rear plate shaped to cooperate with portions of said second support means to position said first connector means in mating connection with said second connector means, spring means within said frame contacting said movable plate for urging said movable plate towards said rear plate so as to urge said first connector means into mating connection with said second connector means when said vehicles are in coupled relation, a selectively actuatable, longitudinally-reciprocable motor connected to said frame and to said movable plate for moving said plate away from said rear plate upon actuation of said motor to disconnect said first and second connector means, movable locking arm means movably connected with said fifth wheel, said locking arm means extending transversely of said slot rearwardly of said coupling pin for preventing movement of said coupling pin out of said slot, selectively actuatable safety lock means operatively connected with said locking arm means and said fifth wheel for preventing movement of said locking arm means, said safety lock means permitting movement of said locking arm means upon actuation of said safety lock means, selectively actuatable unlock means operatively connected with said locking arm means and said fifth wheel for moving said locking arm means out of said slot upon actuation of said unlock means, safety unlock means operatively connected with said safety lock means for controlling the release of said safety lock means to permit said locking arm means to be moved, unlock control means operatively connected with said unlock means for actuating said unlock means to move said locking arm means out of said slot, landing motor control means operatively connected with said landing motor when said service lines on said vehicles are connected, said landing motor control means for selectively directing power to said landing motor to move said landing gear to the inoperative position thereof, said service disconnection control means and said landing motor control means being operatively connected for permitting operation of said service disconnection means only after operation of said landing motor, said service disconnection control means and said safety lock control means being operatively connected for permitting operation of said safety lock control means only after operation of said service disconnection means, said unlock control means being operatively connected with said safety lock means for permitting operation of said unlock means only after operation of said safety lock means, whereby on uncoupling, the operations of moving said landing gear to its operative position, disconnecting said service lines, freeing said locking arm means for movement and moving said locking arm means to release said coupling pin so that said vehicles may be separated can only be performed in that sequence.

References Cited

UNITED STATES PATENTS

| | | | |
|---|---|---|---|
| 2,092,115 | 9/1937 | Gurton et al. | 280—421 |
| 2,623,753 | 12/1952 | Madigan | 280—434 X |
| 2,667,365 | 1/1954 | Hollifield | 280—434 |
| 2,852,273 | 9/1958 | Hudson | 280—420 |
| 2,859,980 | 11/1958 | Holland | 280—421 |
| 2,998,267 | 8/1961 | Zajac et al. | 280—421 X |
| 3,165,335 | 1/1965 | Methven | 280—421 |
| 3,181,887 | 5/1965 | Boylan | 280—421 |

LEO FRIAGLIA, *Primary Examiner.*